United States Patent
Tanishima et al.

(10) Patent No.: US 9,327,715 B2
(45) Date of Patent: May 3, 2016

(54) CONTROL DEVICE FOR ELECTRIC-POWERED VEHICLE

(71) Applicant: Nissan Motor Co., Ltd., Yokohama-shi, Kanagawa (JP)

(72) Inventors: Kaori Tanishima, Isehara (JP); Fumihiro Yamanaka, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/759,282

(22) PCT Filed: Jan. 17, 2014

(86) PCT No.: PCT/JP2014/050778
§ 371 (c)(1),
(2) Date: Jul. 6, 2015

(87) PCT Pub. No.: WO2014/129239
PCT Pub. Date: Aug. 28, 2014

(65) Prior Publication Data
US 2015/0353071 A1    Dec. 10, 2015

(30) Foreign Application Priority Data

Feb. 20, 2013 (JP) .................................. 2013-030977

(51) Int. Cl.
*G05D 1/00* (2006.01)
*B60W 10/00* (2006.01)
(Continued)

(52) U.S. Cl.
CPC .................. *B60W 20/10* (2013.01); *B60K 6/36* (2013.01); *B60K 6/387* (2013.01); *B60K 6/48* (2013.01); *B60K 6/54* (2013.01); *B60K 6/547* (2013.01);
(Continued)

(58) Field of Classification Search
CPC ....... F16H 61/04; F16H 61/684; F16H 63/50; B60K 6/48; B60K 6/547; B60W 10/10; B60W 20/00; Y02T 10/6239; Y02T 10/6286; Y02T 10/7077
USPC ..................... 701/22, 35, 208, 211, 213, 300; 180/65.1–65.8; 340/995.1, 995.19
See application file for complete search history.

(56) References Cited

U.S. PATENT DOCUMENTS

| | | | | |
|---|---|---|---|---|
| 5,449,329 A | * | 9/1995 | Brandon | ............... F16H 61/061 477/143 |
| 5,810,694 A | * | 9/1998 | Kamada | .............. F16H 61/0021 477/117 |
| 2011/0105275 A1 | * | 5/2011 | Koerner | .................. F02D 37/02 477/109 |

FOREIGN PATENT DOCUMENTS

JP   2011-230741 A   11/2011
JP   2012-87920 A    5/2012

*Primary Examiner* — Muhammad Shafi
(74) *Attorney, Agent, or Firm* — Global IP Counselors, LLP

(57) ABSTRACT

An electric vehicle control device is provided that ensures a required coupling capacity precision of a friction coupling element by appropriately switching a torque sharing rate during a shift transition period. The control device includes a motor, an automatic transmission, a shift controller, a frictional engagement element, a control unit and an engagement capacity control section. The frictional engagement element is disposed in a power transmission path from the motor to a driving wheel. The control unit switching delays switching a torque sharing rate of the frictional engagement element during a shift transition period until the start of the shifting procedure, and continuously switches the current gear sharing rate to a subsequent gear sharing rate in accordance with a degree of the shifting procedure when the shifting procedure starts.

11 Claims, 10 Drawing Sheets

(51) Int. Cl.
*B60W 20/00* (2016.01)
*B60W 30/20* (2006.01)
*B60W 10/06* (2006.01)
*B60W 10/08* (2006.01)
*B60W 10/02* (2006.01)
*B60W 10/10* (2012.01)
*B60K 6/54* (2007.10)
*B60K 6/36* (2007.10)
*B60K 6/387* (2007.10)
*B60K 6/48* (2007.10)
*B60K 6/547* (2007.10)
*F16H 61/06* (2006.01)
*F16H 63/50* (2006.01)
*B60W 10/115* (2012.01)
*B60W 30/19* (2012.01)
*F16H 61/686* (2006.01)

(52) U.S. Cl.
CPC ............... *B60W 10/02* (2013.01); *B60W 10/06* (2013.01); *B60W 10/08* (2013.01); *B60W 10/10* (2013.01); *B60W 10/115* (2013.01); *B60W 20/00* (2013.01); *B60W 20/40* (2013.01); *B60W 30/19* (2013.01); *B60W 30/20* (2013.01); *F16H 61/061* (2013.01); *F16H 63/502* (2013.01); B60W 2520/10 (2013.01); B60W 2540/10 (2013.01); B60W 2710/021 (2013.01); B60W 2710/027 (2013.01); B60W 2710/06 (2013.01); B60W 2710/08 (2013.01); B60W 2710/1005 (2013.01); B60W 2710/1027 (2013.01); *F16H 61/686* (2013.01); Y02T 10/6221 (2013.01); Y10S 903/909 (2013.01); Y10S 903/914 (2013.01); Y10S 903/917 (2013.01); Y10S 903/93 (2013.01)

|  | B1<br>Fr/B | C1<br>I/C | C2<br>D/C | C3<br>H&LR/C | B2<br>LOW/B | B3<br>2346/B | B4<br>R/B | F1<br>1st OWC | F2<br>1&2 OWC |
|---|---|---|---|---|---|---|---|---|---|
| 1st | (O) |  |  | (O) | O |  |  | O | O |
| 2nd |  |  |  | (O) | O | O |  |  | O |
| 3rd |  |  | O |  | O | O |  |  |  |
| 4th |  |  | O | O |  | O |  |  |  |
| 5th |  | O | O | O |  |  |  |  |  |
| 6th |  | O |  | O |  | O |  |  |  |
| 7th | O | O |  | O |  |  |  | O |  |
| Rev. | O |  |  | O |  |  | O |  |  |

CONTROL DEVICE FOR ELECTRIC-POWERED VEHICLE

CROSS-REFERENCE TO RELATED APPLICATIONS

This application is a U.S. National stage application of International Application No. PCT/JP2014/050778, filed Jan. 17, 2014, which claims priority to Japanese Patent Application 2013-030977 filed in Japan on Feb. 20, 2013. The entire disclosure of Japanese Patent Application 2013-030977 is incorporated herein by reference.

BACKGROUND

1. Field of the Invention

The present invention relates to an electric vehicle control device, wherein a motor and an automatic transmission are mounted in a drive system and a power transmission path to the driving wheels is provided with a frictional engagement element.

2. Prior Art Documents

In an electric vehicle in which a motor and an automatic transmission are mounted in a drive system and a power transmission path to the driving wheels is provided with a second clutch, that which switches the torque sharing rate of the second clutch during a shift transition period at the time of a gear shift start and a gear shift end is known (see, Japanese Laid Open Patent Application No. 2012-87920). The torque sharing rate is a sharing rate of transmission torque allocated to the second clutch according to the engagement

SUMMARY

However, in the prior art described above, the torque sharing rate of the second clutch during a shift transition period is switched using the start and the gear shift end as triggers. Consequently, in a situation in which precision in the engagement capacity of the second clutch during a shift transition period is required, there is the problem that the torque sharing rate will be smaller than intended, or become larger than the intended torque sharing rate.

For example, in the case of becoming smaller than the intended torque sharing rate, there are cases in which the second clutch slips during a shift transition period, and a change in the rotational speed due to the slip of the second clutch is assumed to be a change in the gear ratio, resulting in an erroneous determination of the gear shift inertia phase. When becoming larger than the intended torque sharing rate, the second clutch does not slip easily, and when an engine start request intervenes during a shift transition period, the slip-in time, from the engine start request to when the second clutch starts to slip, becomes long.

In view of the problems described above, an object of the present invention is to provide an electric vehicle control device that ensures the required engagement capacity precision of a frictional engagement element by appropriately switching a torque sharing rate during a shift transition period.

In order to achieve the object above, the electric vehicle control device of the present invention comprises a motor provided as a drive source, an automatic transmission, a shift controller, a frictional engagement element, a control unit for switching the torque sharing rate, and an engagement capacity control section. The automatic transmission is disposed between the motor and the driving wheel and comprises a plurality of shifting elements for switching a plurality of gear stages. The shift controller sets the shifting element that is engaged during a gear shift by the automatic transmission as the engagement element, and sets the shifting element that is released as the release element, to execute the gear shift. The frictional engagement element is disposed in a power transmission path between the motor and the driving wheels, and is engaged or slip-engaged as an element other than a shifting element that is involved in the gear shift of the automatic transmission. The control unit delays switching the torque sharing rate, which is a sharing rate of transmission torque allocated to the frictional engagement element according to the engagement capacity, during a shift transition period from a start of the gear shift to an end of the gear shift, until the start of the shifting procedure, and continuously switches the current gear sharing rate to a subsequent gear sharing rate in accordance with the degree of the shifting procedure when the shifting procedure starts. The engagement capacity control section controls the engagement capacity of the frictional engagement element during the shift transition period, in accordance with the switched torque sharing rate.

Therefore, the switching of the torque sharing rate of the frictional engagement element is delayed during a shift transition period from the start of the gear shift to the end of the gear shift until the start of the shifting procedure, and the current gear sharing rate is continuously switched to a subsequent gear sharing rate in accordance with the degree of the shifting procedure when the shifting procedure starts. Then, the engagement capacity of the frictional engagement element during a shift transition period is controlled in accordance with the switched torque sharing rate. That is, when switching the torque sharing rate from the current gear sharing rate to a subsequent gear sharing rate that is lower than the current gear sharing rate, if switched to the subsequent gear sharing rate at the gear shift start timing, the sharing rate will become lower than the target torque sharing rate in the gear shift start area. In contrast, even if shifting is started, by maintaining the current gear sharing rate until the shifting procedure starts, the torque sharing rate will not decrease in the gear shift start area; as a result, slipping of the frictional engagement element is prevented. On the other hand, when switching from the current gear sharing rate to a subsequent gear sharing rate that is higher than the current gear sharing rate, if switched to the subsequent gear sharing rate at the gear shift start timing, the sharing rate will become higher than the target torque sharing rate in the gear shift start area. In contrast, even if shifting is started, by maintaining the current gear sharing rate until the shifting procedure starts, the torque sharing rate will not increase in the gear shift start area; as a result, the slip-in time of the frictional engagement element is decreased. In this manner, the required engagement capacity precision of a frictional engagement element can be ensured by appropriately switching the torque sharing rate during a shift transition period.

BRIEF DESCRIPTION OF THE DRAWINGS

Referring now to the attached drawings which form a part of this original disclosure.

DETAILED DESCRIPTION OF THE EMBODIMENTS

Figure 1:
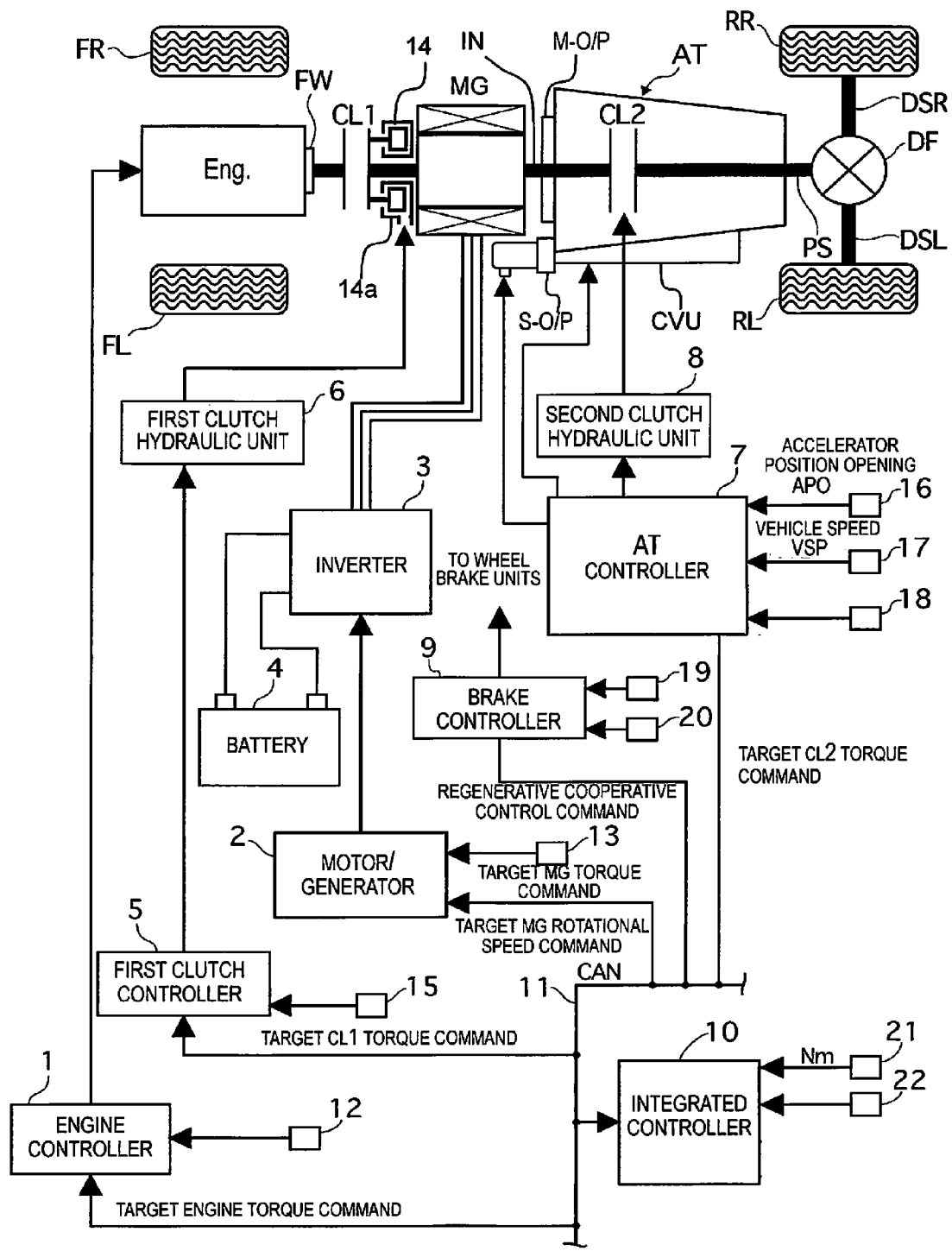
FIG. 1 is an overall system view illustrating a rear-wheel-drive FR hybrid vehicle (one example of an electric vehicle) to which is applied the control device of the first embodiment.

A preferred embodiment for realizing the electric vehicle control device of the present invention is explained below based on the first embodiment illustrated in the drawings.

First Embodiment

The configuration is described first. The "overall system configuration," the "schematic configuration of the automatic transmission," the "configuration of the CL2 engagement capacity control," and the "configuration of the control for switching the CL2 torque sharing rate," will be separately described regarding the configuration of the electric vehicle control device in the first embodiment.

Overall System Configuration

Figure 2:
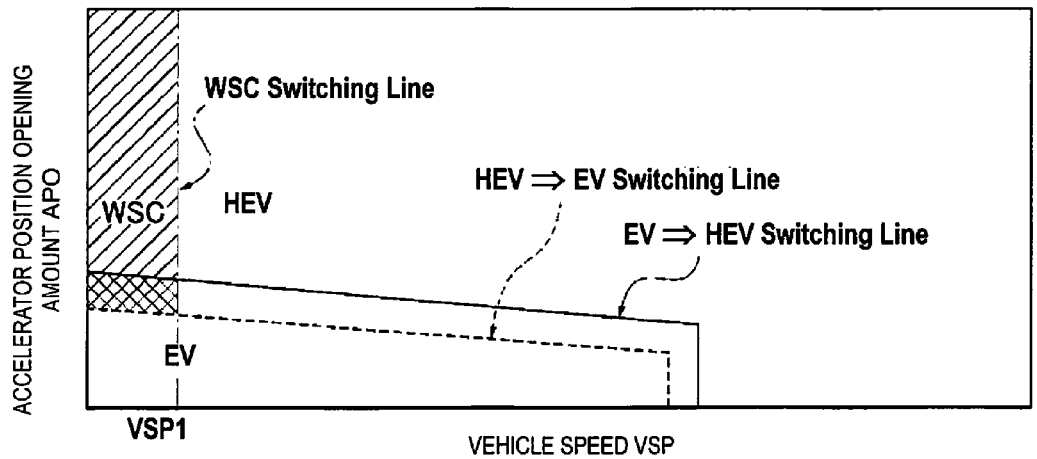
FIG. 2 is a view illustrating one example of an EV-HEV selection map that is set in the mode selection unit of the integrated controller of the first embodiment.

FIG. 1 illustrates a rear-wheel-drive FR hybrid vehicle to which is applied the electric vehicle control device of the first embodiment; FIG. 2 illustrates one example of an EV-HEV selection map that is set in a mode selection unit of an integrated controller 10. The overall system configuration will be described below based on FIG. 1 and FIG. 2.

The drive system of an FR hybrid vehicle comprises an engine Eng, a first clutch CL1, a motor/generator MG (motor), a second clutch CL2 (frictional engagement element), an automatic transmission AT, a transmission input shaft 1N, a propeller shaft PS, a differential DF, a left drive shaft DSL, a right drive shaft DSR, a left rear wheel RL (driving wheel), and a right rear wheel RR (driving wheel), as illustrated in FIG. 1. M-O/P is a mechanical oil pump, S-O/P is an electric oil pump, FL is a left front wheel, FR is a right front wheel, and FW is a flywheel.

The first clutch CL1 is an engagement element provided between the engine Eng and the motor/generator MG, which is a so-called normally closed type clutch that is put in an engaged state by a biasing force of a diaphragm spring, and etc., when CL1 hydraulic pressure is not applied, and that is released by applying CL1 hydraulic pressure that counteracts this biasing force.

The automatic transmission AT is a stepped transmission in which the gear stages of forward seven gears/reverse one gear are automatically switched in accordance with the vehicle speed, accelerator opening, or the like. A frictional engagement element (clutch or brake) for shifting the automatic transmission AT is used as the second clutch CL2 that is disposed in a power transmission path from the motor/generator MG to the left and right rear wheels RL, RR, rather than that which is newly added as a dedicated clutch that is independent of the automatic transmission AT. That is, of the plurality of frictional engagement elements that are engaged at each gear stage of the automatic transmission AT, the frictional engagement element that is selected as an element that conforms to the engagement conditions, and etc., is configured to be the second clutch CL2. The first clutch hydraulic unit 6 and the second clutch hydraulic unit 8 are incorporated in an AT hydraulic control valve unit CVU that is provided to the automatic transmission AT.

This FR hybrid vehicle comprises an electric vehicle mode (hereinafter referred to as "EV mode"), a hybrid vehicle mode (hereinafter referred to as "HEV mode"), and a drive torque control mode (hereinafter referred to as "WSC mode"), as modes according to differences in the driving mode.

The "EV mode" is a mode in which the first clutch CL1 is released and in which the motor/generator MG is the only drive source, comprising a motor drive mode (motor powering) and a generator generation mode (generator regeneration). This "EV mode" is selected when, for example, the required driving force is low and a battery SOC is secured.

The "HEV mode" is a mode in which the first clutch CL1 is put in an engaged state and in which the engine Eng and the motor/generator MG are configured as the drive source, comprising a motor assist mode (motor powering), an engine generation mode (generator regeneration), and a regenerative deceleration generation mode (generator regeneration). This "HEV mode" is selected when, for example, the required driving force is high, or when a battery SOC is lacking.

The "WSC mode" is a mode in which the driving mode is the "HEV mode," but the torque transmission capacity of the second clutch CL2 is controlled while maintaining the second clutch CL2 in a slip-engaged state, by controlling the rotational speed of the motor/generator MG. The torque transmission capacity of the second clutch CL2 is controlled so that the driving force that is transmitted via the second clutch CL2 will be the required driving force that is represented by the accelerator-operation amount of the driver. This "WSC mode" is selected when the engine rotational speed is in a region that falls below the idling rotational speed, as when starting when the "HEV mode" is selected.

The control system of the FR hybrid vehicle is configured to comprise an engine controller 1, a motor controller 2, an inverter 3, a battery 4, a first clutch controller 5, a first clutch hydraulic unit 6, an AT controller 7, a second clutch hydraulic unit 8, a brake controller 9, and an integrated controller 10, as illustrated in FIG. 1.

Each of the controllers 1, 2, 5, 7, and 9 described above and the integrated controller 10 are connected via a CAN communication line 11 that allows information exchange with each other. 12 is an engine rotational speed sensor, 13 is a resolver, 15 is a first clutch stroke sensor that detects the stroke position of a piston 14a of a hydraulic actuator 14, 19 is a wheel speed sensor, and 20 is a brake stroke sensor.

The AT controller 7 inputs information from the acceleration opening amount sensor 16, the vehicle speed sensor 17, an inhibitor switch 18 that detects the selected range position (N range, D range, R range, P range, etc.), and the like. Then, when traveling while selecting the D range, the optimum gear stage is searched from the positions in which the operating point determined from the accelerator position opening amount APO and the vehicle speed VSP exists on the shifting map (refer to FIG. 5), and a control command for obtaining the searched gear stage is output to the AT hydraulic control valve unit CVU. In addition to this shift control, control of full engagement (HEV mode)/slip-engagement (engine start)/release (EV mode) of the first clutch CL1 is executed, based on a command from the integrated controller 10. Also, the control of full engagement (HEV mode)/µ slip-engagement (EV mode)/rotational difference absorption slip-engagement (WSC mode)/variable torque blocking slip-engagement (engine start/stop mode) of the second clutch CL2 is executed.

The integrated controller 10 manages the energy consumption of the entire vehicle and assumes the function of running the vehicle at maximum efficiency; necessary information from the motor rotational speed sensor 21 that detects the motor rotational speed Nm and from other sensor switches 22 as well as information via the CAN communication line 11 are input thereto. This integrated controller 10 comprises a mode selection unit that selects a mode searched from the positions in which the operating point determined from the accelerator position opening amount APO and the vehicle speed VSP exists on an EV-HEV selection map illustrated in FIG. 2 as the target mode. Then, the integrated controller performs an engine start control when switching the mode from the "EV mode" to the "HEV mode." Additionally, the integrated controller performs an engine stop control when switching the mode from the "HEV mode" to the "EV mode."

Schematic Configuration of the Automatic Transmission

Figure 3:
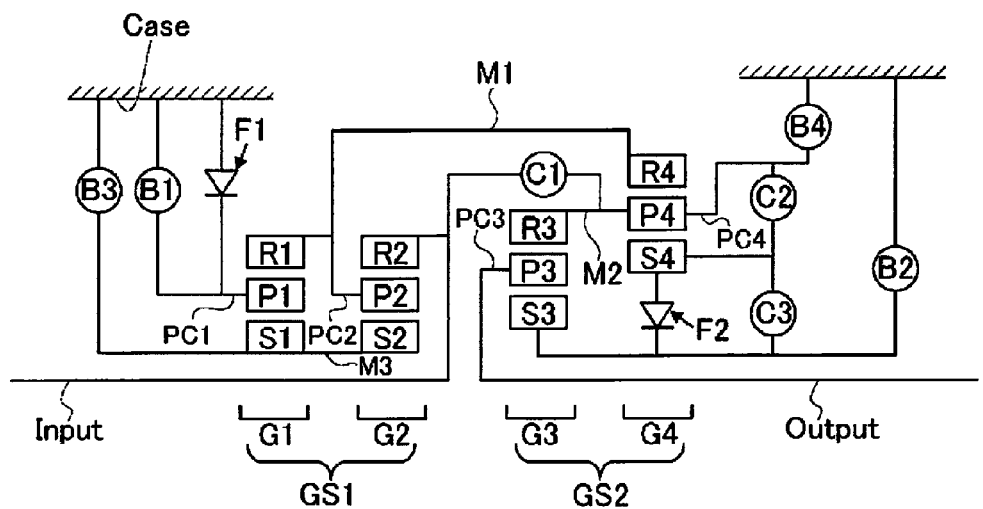
FIG. 3 is a skeleton view illustrating one example of an automatic transmission comprising a shifting element which becomes the transmission control target and a second clutch which becomes the engagement capacity control target, in the control device of the first embodiment.
Figures 4, 5:
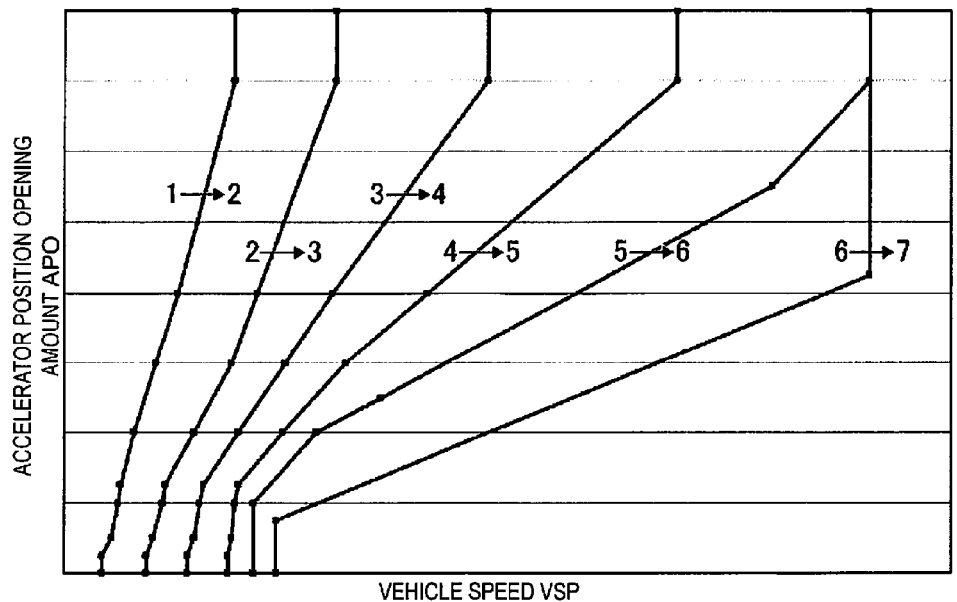
FIG. 4 is an engagement operation table illustrating the engagement state of each frictional engagement element in each gear stage of the automatic transmission of the first embodiment.
FIG. 5 is a view illustrating one example of a shifting map of the automatic transmission set in the AT controller in the first embodiment.

FIG. 3 illustrates a skeleton view of one example of the automatic transmission AT in the first embodiment; FIG. 4 illustrates the engagement state of each frictional engagement element in each gear stage of the automatic transmission AT; and FIG. 5 illustrates one example of a shifting map of the automatic transmission AT that is set in the AT controller 7. The schematic configuration of the automatic transmission AT will be described below based on FIG. 3 to FIG. 5.

The automatic transmission AT is a forward seven gears/reverse one gear stepped automatic transmission; the driving force from at least one of the engine Eng and the motor/generator MG is input from a transmission input shaft Input; and the rotational speed is changed by a shift gear mechanism comprising four planetary gears and seven frictional engagement elements and outputted from the transmission output shaft Output, as illustrated in FIG. 3.

Regarding the shift gear mechanism described above, a first planetary gear set GS1 configured from a first planetary gear G1 and a second planetary gear G2, and a second planetary gear set GS2 configured from a third planetary gear G3 and a fourth planetary gear G4, are arranged coaxially in that order. Additionally, a first clutch C1, a second clutch C2, a third clutch C3, a first brake B1, a second brake B2, a third brake B3, and a fourth brake B4 are arranged as hydraulically actuated frictional engagement elements. Also, a first one way clutch F1 and a second one way clutch F2 are arranged as mechanically actuated engagement elements.

The first planetary gear G1, second planetary gear G2, third planetary gear G3, and fourth planetary gear G4 are single-pinion type planetary gears, comprising sun gears (S1-S4), ring gears (R1-R4), and carriers (PC1-PC4) that support pinions (P1-P4) that engage with both gears (S1-S4), (R1-R4).

The transmission input shaft Input is coupled to the second ring gear R2, and the rotational driving force from at least one of the engine Eng and the motor/generator MG is input thereto. The transmission output shaft Output is coupled to the third carrier PC3 and transmits the output rotational driving force to the driving wheels (left and right rear wheels RL, RR) via a final gear or the like.

The first ring gear R1, the second carrier PC2, and the fourth ring gear R4 are integrally coupled by a first coupling member M1. The third ring gear R3 and the fourth carrier PC4 are integrally coupled by a second coupling member M2. The first sun gear S1 and the second sun gear S2 are integrally coupled by a third coupling member M3.

FIG. 4 is an engagement operation table; in FIG. 4, the ○ mark indicates that the frictional engagement element is hydraulically engaged in a driving state, the (○) mark indicates that the frictional engagement element is hydraulically engaged in a coasting state (one-way clutch actuation in a driving state), and no marks indicates that the frictional engagement element is in a released state. Additionally, the frictional engagement element in an engaged state indicated by hatching indicates an element that is used as the second clutch CL2 in each gear stage.

Regarding shifting to an adjacent gear stage, gear stages of the forward seven gears and reverse one gear can be realized by a substitution gear change, in which, of the frictional engagement elements described above, one engaged frictional engagement element is released and one released frictional engagement element is engaged, as illustrated in FIG. 4. Furthermore, when the gear stage is in the first gear stage and the second gear stage, the second brake B2 shall be the second clutch CL2. When the gear stage is in the third gear stage, the second clutch C2 shall be the second clutch CL2. When the gear stage is in the fourth gear stage and the fifth gear stage, the third clutch C3 shall be the second clutch CL2. When the gear stage is in the sixth gear stage and the seventh gear stage, the first clutch C1 shall be the second clutch CL2. When the gear stage is in the reverse stage, the fourth brake B4 shall be the second clutch CL2.

FIG. 5 is a shifting map; when the operating point on the map specified by the vehicle speed VSP and the accelerator position opening amount APO crosses an upshift line, an upshift command is outputted. For example, when the gear stage is in the first stage and the operating point (VSP, APO) crosses the 1→2 upshift line due to a rise in the vehicle speed VSP, a 1→2 upshift command is outputted. FIG. 5 describes only an upshift line, but, of course, a down shift line is also set with a hysteresis with respect to the upshift line.

Configuration of the CL2 Engagement Capacity Control

Figure 6:
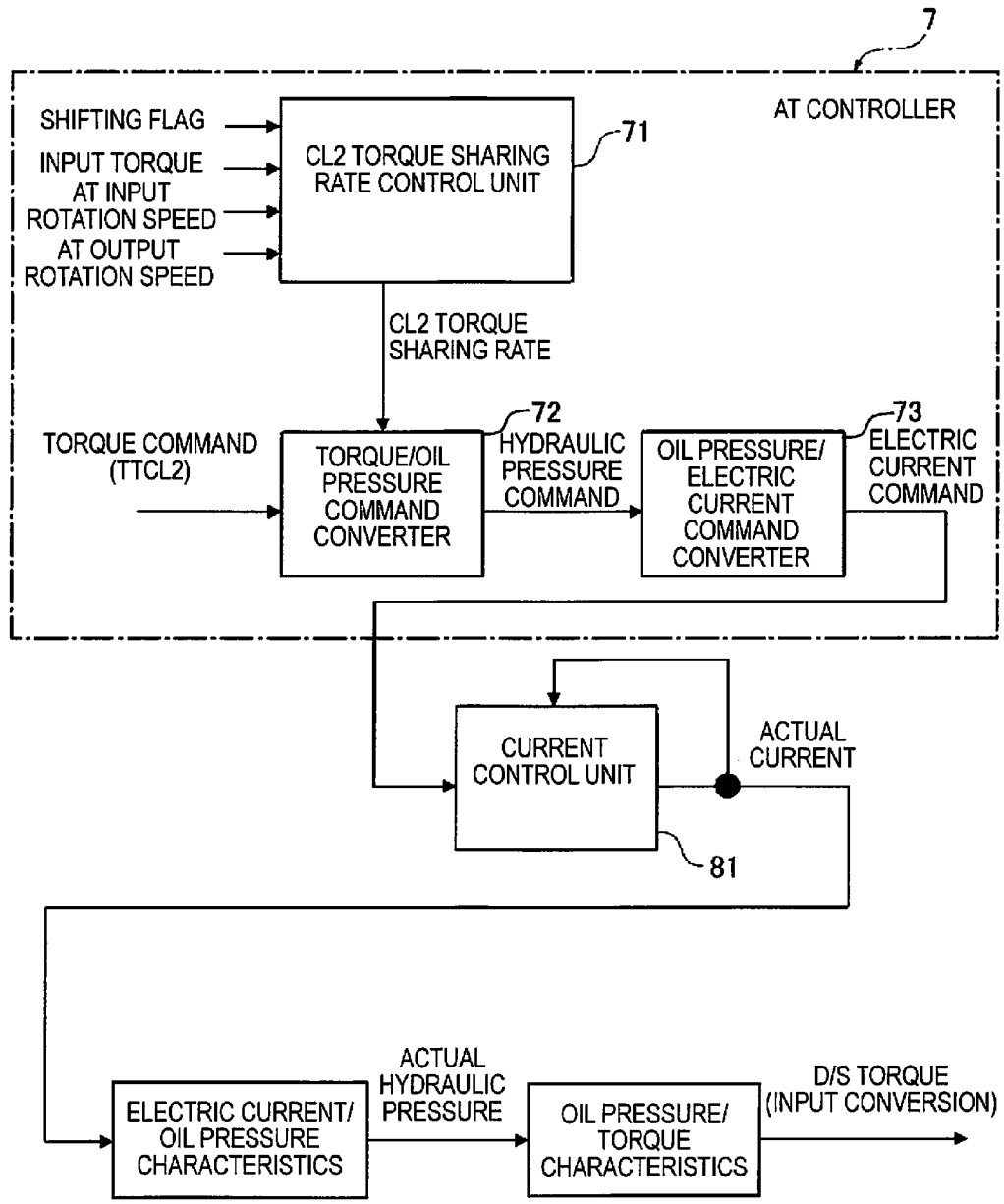
FIG. 6 is a control block diagram illustrating the configurations of a control unit for switching the CL2 torque sharing rate and a CL2 engagement capacity control unit provided to the AT controller in the first embodiment.

FIG. 6 illustrates the configurations of a control unit for switching the CL2 torque sharing rate and a CL2 engagement capacity control unit provided to the AT controller 7 in the first embodiment. The configuration of the CL2 engagement capacity control will be described below based on FIG. 6.

The AT controller 7 comprises a control unit 71 for switching the CL2 torque sharing rate (control means for switching the torque sharing rate), a torque/oil pressure command converter 72, and an oil pressure/electric current command converter 73, as illustrated in FIG. 6.

The control unit 71 for switching the CL2 torque sharing rate delays switching the CL2 torque sharing rate, which is a sharing rate of the transmission torque allocated to the engagement capacity of the second clutch CL2, during a shift transition period from the start to the end of EV shifting, until the start of the shifting procedure, and continuously switches the current gear sharing rate to a subsequent gear sharing rate in accordance with the degree of the shifting procedure when the shifting procedure starts. Information such as the shifting flag, the input torque, the AT input rotational speed, and the AT output rotational speed, is input into this control unit 71 for switching the CL2 torque sharing rate, and the calculated CL2 torque sharing rate is outputted to the torque/oil pressure command converter 72.

After the CL2 torque command (TTCL2) and the CL2 torque sharing rate from the control unit 71 for switching the CL2 torque sharing rate are input, the torque/oil pressure command converter 72 calculates a hydraulic pressure command according to the following Formula (1), based on these pieces of information.

Hydraulic pressure command=CL2 torque command/ torque conversion coefficient×CL2 torque sharing rate+return pressure  (1)

Here, the torque conversion coefficient is the value {μ× mean diameter× number (n)× piston area (A)}, where the clutch torque of the second clutch CL2 is given by the formula: μ× mean diameter× number (n)× hydraulic pressure (P)× piston area (A)− return spring force (Fs).

The return pressure is the hydraulic pressure that counteracts the return spring force (Fs).

The oil pressure/electric current command converter 73 converts the hydraulic pressure command from the torque/oil pressure command converter 72 to an electric current command using a hydraulic pressure-current map or the like. The torque/oil pressure command converter 72 and the oil pressure/electric current command converter 73 correspond to the engagement capacity control means that controls the engagement capacity of the second clutch CL2 during a shift transition period in accordance with the switched CL2 torque sharing rate.

The electric current command from the oil pressure/electric current command converter 73 is outputted to a current control unit 81 of the second clutch hydraulic unit 8, converted to an actual current in the current control unit 81 by feedback control, and applied to the hydraulic actuator of the second clutch CL2. The actual hydraulic pressure is inferred from the electric current/oil pressure characteristics of the hydraulic actuator of the second clutch CL2, and the drive shaft torque (D/S torque) converted to the input is inferred from the hydraulic pressure-torque characteristics of the second clutch CL2.

Configuration of the Control for Switching the CL2 Torque Sharing Rate

Figure 7:
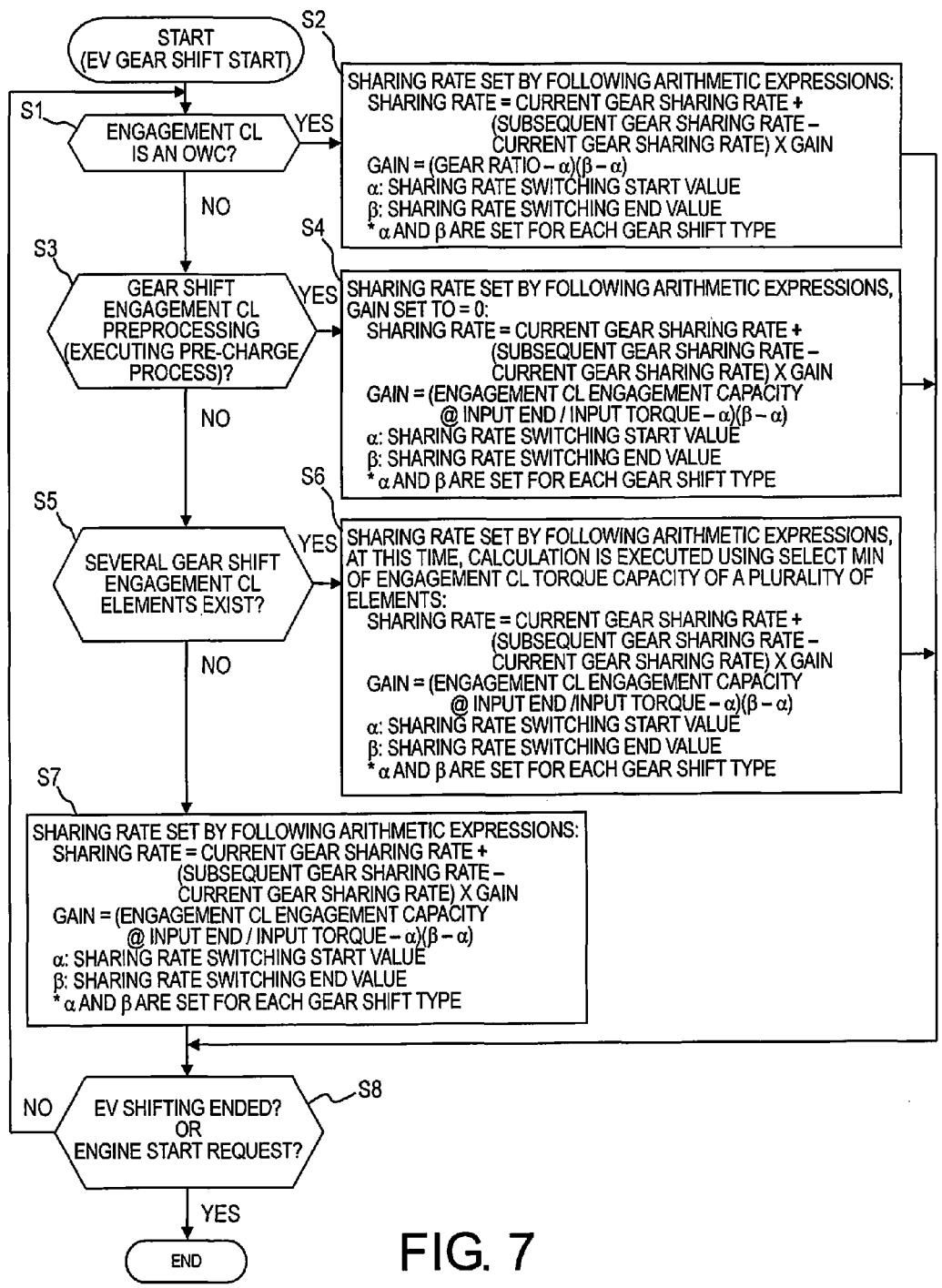
FIG. 7 is a flowchart illustrating the flow of a process to control the switching of the CL2 torque sharing rate that is executed at the time of EV shifting in the control unit for switching the CL2 torque sharing rate provided to the AT controller of the first embodiment.
Figure 8:
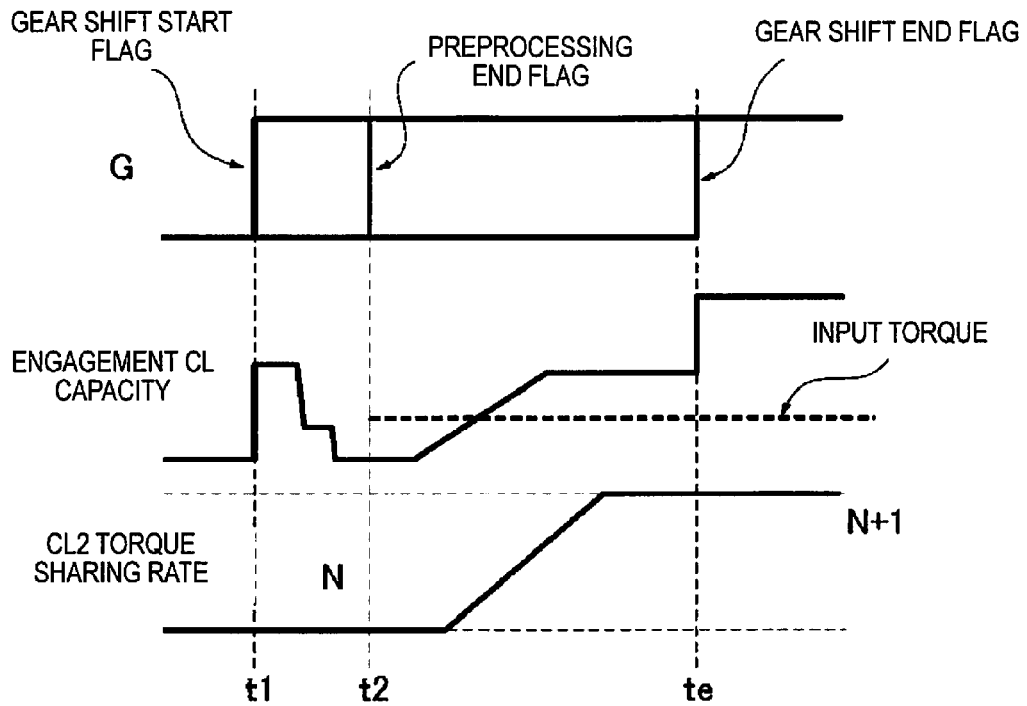
FIG. 8 is a relational characteristic view illustrating the relationship between a shifting flag G, the engagement capacity (engagement CL capacity), and the torque sharing rate during a shift transition period in the process to control the switching of the CL2 torque sharing rate of the first embodiment.
Figure 9:
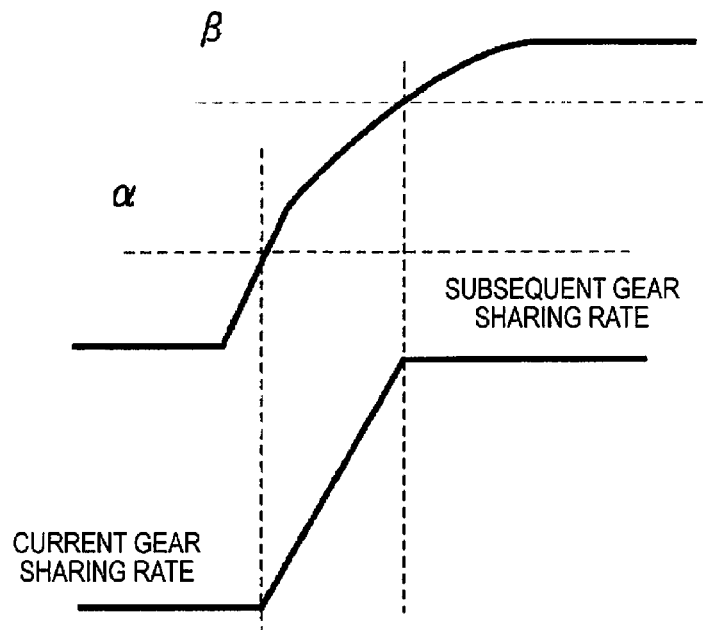
FIG. 9 is a relational characteristic view illustrating the relationship between (engagement CL capacity/input torque) which represents the degree of the shifting procedure and the CL2 torque sharing rate during a shift transition period in the process to control the switching of the CL2 torque sharing rate of the first embodiment.

FIG. 7 illustrates the flow of a process to control the switching of the CL2 torque sharing rate that is executed in the control unit for switching the CL2 torque sharing rate provided to the AT controller 7 of the first embodiment. FIG. 8 illustrates the relationship between the shifting flag, the engagement CL capacity, and the CL2 torque sharing rate. FIG. 9 illustrates the relationship between the engagement CL capacity/input torque and the CL2 torque sharing rate. The configuration of the control for switching the CL2 torque sharing rate will be described below based on FIG. 7 to FIG. 9. The flowchart illustrated in FIG. 7 is started with a starting of the EV shifting by a gear change request while in the EV mode as the trigger.

In step S1, following a starting of the EV shifting, or, a determination in step S8 that EV shifting is taking place and that an engine start request is absent, whether or not the engagement element (engagement CL) in the EV shifting pattern at that time is a one-way clutch (OWC), is determined. In the case of YES (the engagement CL is an OWC), the process proceeds to step S2, and in the case of NO (the engagement CL is not an OWC), the process proceeds to step S3. Here, "the engagement CL is an OWC" means, for example in the case of the automatic transmission AT of the first embodiment, a 2→1 down shift pattern in which the first one way clutch F1 is the engagement element.

In step S2, following a determination in step S1 that the engagement CL is a OWC, the CL2 torque sharing rate (sharing rate) is set by the following calculation formula, then the process proceeds to step S8.

Sharing rate=current gear sharing rate+(subsequent gear sharing rate−current gear sharing rate)×gain Gain=(gear ratio−α)(β−α)

α: sharing rate switching start value

β: sharing rate switching end value

α and β are set for each gear shift type

The gear ratio here represents the degree of the shifting procedure when the engagement CL is a one-way clutch (OWC), and is obtained by calculation from the ratio of the transmission input rotation speed and the transmission output rotation speed.

In step S3, following a determination in step S1 that the engagement CL is not an OWC, whether or not the engagement element (engagement CL), in a gear shift pattern in which EV shifting has been started, is performing preprocessing, is determined. In the case of YES (engagement CL is performing preprocessing), the process proceeds to step S4, and in the case of NO (engagement CL is not performing preprocessing), the process proceeds to step S5. Here, "engagement CL is performing preprocessing" means that the engagement CL is executing a pre-charge process for reducing a plate gap that a multi-plate clutch or a multi-plate brake has when in a released state, so-called play reduction. This pre-charge process is executed by applying hydraulic pressure to the engagement CL in a stepwise manner, as illustrated in the engagement CL capacity characteristics in FIG. 8, and the engagement CL is determined to be performing preprocessing from a time t1 when a gear shift start flag is set to a time t2 when a preprocessing end flag is set.

In step S4, following a determination in step S3 that the engagement CL is performing preprocessing, the CL2 torque sharing rate (sharing rate) is set by the following calculation formula, then the process proceeds to step S8.

Sharing rate=current gear sharing rate+(subsequent gear sharing rate−current gear sharing rate)×gain Gain=(engagement CL engagement capacity@input end/input torque−α)(β−α)
α: sharing rate switching start value
β: sharing rate switching end value
α and β are set for each gear shift type Here, gain is set to =0 when the engagement CL is performing preprocessing, so the CL2 torque sharing rate is given by the constant value=current gear sharing rate.

In step S5, following a determination in step S3 that the engagement CL is not performing preprocessing, whether or not there are several engagements CL (engagement elements that are involved in gear shifting is determined. In the case of YES (there are several engagement CL), the process proceeds to step S6, and in the case of NO (there is one engagement CL), the process proceeds to step S7. Here, "there is are several engagement CL" means a skip shift pattern such as 3→5 upshifting in which the first clutch C1 and the third clutch C3 are the engagement elements, or 5→3 down shifting in which the second brake B2 and the third brake B3 are the engagement elements, when providing the automatic transmission AT of the first embodiment and a second clutch CL2 that is independent of the automatic transmission AT. Also, "there is one engagement CL" means a substitution gear change pattern such as upshifting to an adjacent gear stage→down shifting, in the automatic transmission AT of the first embodiment.

In step S6, following a determination in step S5 that there are several engagement CL, the CL2 torque sharing rate (sharing rate) is set by the following calculation formula, then the process proceeds to step S8.

Sharing rate=current gear sharing rate+(subsequent gear sharing rate−current gear sharing rate)×gain Gain=(engagement CL engagement capacity@input end/input torque−α)(β−α)
α: sharing rate switching start value
β: sharing rate switching end value
α and β are set for each gear shift type Here, if there are several engagement CL, the minimum value with the lowest engagement CL engagement capacity is selected (SelectMin) from among the several engagements CL, to calculate the torque sharing rate. The "engagement CL engagement capacity @ input end" information is obtained by converting the actual current to the engagement CL to hydraulic pressure using the electric current/oil pressure characteristics, and further, converting to an input end torque using the hydraulic pressure-torque characteristics (FIG. 6).

In step S7, following a determination in step S5 that there is one engagement CL, the CL2 torque sharing rate (sharing rate) is set by the following calculation formula, then the process proceeds to step S8.

Sharing rate=current gear sharing rate+(subsequent gear sharing rate−current gear sharing rate)×gain Gain=(engagement CL engagement capacity@input end/input torque−α)(β−α)
α: sharing rate switching start value
β: sharing rate switching end value
α and β are set for each gear shift type Here, "α" is a sharing rate switching start value from the current gear sharing rate to a subsequent gear sharing rate in an (engagement CL capacity/input torque) characteristic, which represents the degree of the shifting procedure when the engagement CL is a frictional engagement element, as illustrated in FIG. 9. "β" is a sharing rate switching end value from the current gear sharing rate to a subsequent gear sharing rate in an (engagement CL capacity/input torque) characteristic, which represents the degree of the shifting procedure when the engagement CL is a frictional engagement element, as illustrated in FIG. 9. These α and β may be set at values of about 0-2, and are set for each gear shift type, as illustrated in FIG. 8. The memory capacity of α and β are configured to be reduced by grouping those with close values among the α and β set for each gear shift type.

In step S8, following the setting of the CL2 torque sharing rate by any one step among step S2, step S4, step S6, and step S7, whether or not an EV gear shift end or an engine start request is present is determined. In the case of YES (EV gear shift end or engine start request present), the process proceeds to End, and in the case of NO (EV shifting taking place and engine start request absent), the process returns to step S1. Here, "EV gear shift end" is determined by a gear shift end flag being set at time te, as illustrated in FIG. 8. Also, when an engine start request intervenes during EV shifting, a slip-engagement control of the second clutch CL2 that suppresses torque variation accompanying engine start is initiated, instead of the CL2 engagement capacity control.

Next, the effects are described. The "Effect to control the switching of the CL2 torque sharing rate," the "CL2 engagement capacity control effect during a shift transition period when the CL2 torque sharing rate decreases," and the "CL2 engagement capacity control effect during a shift transition period when the CL2 torque sharing rate increases" will be separately described regarding the effects of the FR hybrid vehicle control device of the first embodiment.

Effect to Control the Switching of the CL2 Torque Sharing Rate

In the first embodiment, as a CL2 torque sharing rate switching configuration, a configuration is employed in which switching the CL2 torque sharing rate is delayed during a shift transition period from the start to the end of EV shifting, until the start of the shifting procedure. Then, the CL2 torque sharing rate is continuously switched from the current gear sharing rate to a subsequent gear sharing rate in accordance with the degree of the shifting procedure when the shifting procedure starts. The effect to control the switching of the CL2 torque sharing rate will be explained below, separated into cases of "performing preprocessing," "engagement CL is a OWC," "there are several engagements CL," and "there is a singular engagement CL," based on the flowchart illustrated in FIG. 7.

First, when the engagement CL, which is engaged during EV shifting, is performing preprocessing (executing a pre-charge process), the flow: step S1→step S3→step S4→step S8 in the flowchart of FIG. 7 is repeated. That is, in step S4, the gain is set to =0 during preprocessing, from the gear shift start to when the engagement CL ends the preprocess, and the current gear sharing rate of the current gear stage prior to shifting is maintained as the CL2 torque sharing rate.

Next, when the preprocessing of the engagement CL, which is engaged during EV shifting, has been ended but when in a gear shift pattern in which the engagement CL is a one-way clutch, the flow: step S1→step S2→step S8 is repeated. That is, in step S2, from when the engagement CL ends the preprocessing until the gear ratio reaches a sharing rate switching start threshold value $\alpha$, the current gear sharing rate of the current gear stage prior to shifting is maintained as the CL2 torque sharing rate, continuing from when performing preprocessing. Then, when the gear ratio reaches the sharing rate switching start threshold value $\alpha$, gain is calculated from the formula (gear ratio–$\alpha$) ($\beta$–$\alpha$) until the sharing rate switching end value $\beta$, and the CL2 torque sharing rate that is continuously changed from the current gear sharing rate to a subsequent gear sharing rate in accordance with the degree of the shifting procedure is calculated by the formula: current gear sharing rate+(subsequent gear sharing rate-current gear sharing rate)× gain. Then, from when exceeding the sharing rate switching end value $\beta$ to the gear shift end, the subsequent gear sharing rate of the subsequent gear stage after shifting is maintained.

In this manner, the present embodiment is configured to use a gear ratio value, which is the ratio of the input/output rotational speed of the automatic transmission AT, as an index representing the degree of the shifting procedure, when in a gear shift pattern in which the engagement CL is a one-way clutch. Therefore, when the engagement CL is a one-way clutch and the engagement CL capacity cannot be calculated, the CL2 torque sharing rate is appropriately calculated following changes in the gear ratio using a gear ratio value, which represents the degree of the shifting procedure.

Next, when the preprocessing of the engagement CL, which is engaged during EV shifting, has been ended but when in a gear shift pattern in which there are several engagements CL, the flow: step S1→step S3→step S5→step S6→step S8 in the flowchart in FIG. 7 is repeated. That is, in step S6, from when the engagement CL with the lowest engagement capacity is selected from several engagements CL, and the selected engagement CL ends the preprocessing until the gear ratio reaches a sharing rate switching start threshold value $\alpha$, the current gear sharing rate of the current gear stage prior to shifting is maintained as the CL2 torque sharing rate, continuing from when performing preprocessing. Then, when the gear ratio reaches the sharing rate switching start threshold value $\alpha$, gain is calculated from the formula: (engagement CL engagement capacity@input end/ input torque–$\alpha$) ($\beta$–$\alpha$) until the sharing rate switching end value $\beta$; furthermore, the CL2 torque sharing rate that is continuously changed from the current gear sharing rate to a subsequent gear sharing rate in accordance with the degree of the shifting procedure is calculated by the formula: current gear sharing rate+(subsequent gear sharing rate-current gear sharing rate)× gain. Then, from when exceeding the sharing rate switching end value $\beta$ to the gear shift end, the subsequent gear sharing rate of the subsequent gear stage after shifting is maintained as the CL2 torque sharing rate.

In this manner, when in a gear shift pattern in which there are several engagements CL, which are engaged during EV shifting, the engagement CL with the lowest engagement capacity of the several engagements CL is configured to be the target for calculating the CL2 torque sharing rate. That is, if the engagement CL with the highest engagement capacity is set as the target for calculating the CL2 torque sharing rate, the CL2 torque sharing rate tends to increase, and the CL2 capacity safety factor is increased. When this CL2 capacity safety factor is increased and an engine start request intervenes, the CL2 slip-in time, until the second clutch CL2 starts to slip, becomes long. In contrast, if the engagement CL with the lowest engagement capacity is set as the target for calculating the CL2 torque sharing rate, the CL2 torque sharing rate is kept low, and when an engine start request intervenes during EV shifting, the CL2 slip-in time becomes short.

Next, when the preprocessing of the engagement CL, which is engaged during EV shifting, has been ended and when in a gear shift pattern in which there is only one engagement CL, the flow: step S1→step S3→step S5→step S7→step S8 in the flowchart in FIG. 7 is repeated. That is, in step S7, from when the engagement CL ends the preprocessing until the gear ratio reaches a sharing rate switching start threshold value $\alpha$, the current gear sharing rate of the current gear stage prior to shifting is maintained as the CL2 torque sharing rate, continuing from when performing preprocessing. Then, when the gear ratio reaches the sharing rate switching start threshold value $\alpha$, gain is calculated from the formula: (engagement CL engagement capacity@input end/ input torque–$\alpha$) ($\beta$–$\alpha$) until the sharing rate switching end value $\beta$; furthermore, the CL2 torque sharing rate that is continuously changed from the current gear sharing rate to a subsequent gear sharing rate in accordance with the degree of the shifting procedure is calculated by the formula: current gear sharing rate+(subsequent gear sharing rate-current gear sharing rate)× gain. Then, from when exceeding the sharing rate switching end value $\beta$ to the gear shift end, the subsequent gear sharing rate of the subsequent gear stage after shifting is maintained as the CL2 torque sharing rate.

In this manner, in step S7, a value obtained by dividing the engagement capacity of the engagement CL, which is engaged during EV shifting (=engagement CL engagement capacity@input end) by the input torque to the engagement CL, is used as an index representing the degree of the shifting procedure, in the same way as in step S6. Then, the CL2 torque sharing rate for continuously switching from the current gear sharing rate to a subsequent gear sharing rate is calculated. In other words, the continuous change from the torque sharing rate at the current gear stage allocated to the engagement CL, which is engaged during EV shifting, to the torque sharing rate at the subsequent gear stage is used as the index representing the degree of the shifting procedure. In the case of an electric vehicle comprising a motor as a drive source, since the gear ratio can be matched by controlling the motor rotational speed, there are cases in which the shifting procedure cannot be correctly read from the gear ratio. Therefore, by basically using the value of the torque sharing rate allocated to the engagement CL as the index representing the degree of the shifting procedure, following changes in the torque sharing rate allocated to the engagement CL, a CL2 torque sharing rate can be accurately calculated as a torque sharing rate that compensates therefor.

In step S2, step S4, step S6 and step S7, the sharing rate switching start value $\alpha$ and the sharing rate switching end value $\beta$ from the current gear sharing rate to a subsequent gear sharing rate are configured to be set for each gear shift type. Therefore, the required engagement capacity precision of the second clutch CL2 is ensured by appropriately switching the CL2 torque sharing rate during a shift transition period, regardless of the gear shift type.

CL2 Engagement Capacity Control Effect During a Shift Transition Period when the CL2 Torque Sharing Rate Decreases As described above, the object is to ensure the required engagement capacity precision of the second clutch CL2 by appropriately switching the CL2 torque sharing rate during a shift transition period. The CL2 engagement capacity control effect during a shift transition period when the CL2 torque sharing rate decreases will be described below as a specific example of ensuring the required precision, based on FIG. 10 and FIG. 11. An example of a gear shift pattern in which the CL2 torque sharing rate is decreased is, for example, a 4→5 upshift pattern in which the third clutch C3 is set as the second clutch CL2 before and after the gear shift, the first clutch C1 is set as the engagement element of the gear shift, and the third brake B3 is set as the release element of the gear shift.

First, that which performs switching of the CL2 torque sharing rate as a trigger to start EV shifting shall be the comparative example. In the case of this comparative example, as illustrated in the CL2 torque sharing rate characteristics in FIG. 10, the CL2 torque sharing rate is switched from the current gear sharing rate to a subsequent gear sharing rate (<current gear sharing rate) in a stepwise manner, at a gear shift start time t1. Then, the CL2 torque command (the part that increases the engagement capacity during a shift transition period) rises with a steep gradient at the gear shift start time t1, and decreases to the CL2 torque command prior to shifting in a stepwise manner at a gear shift end time te. Therefore, the CL2 hydraulic pressure command, which is obtained by substituting the CL2 torque sharing rate and the CL2 torque command into Formula (1) described above, becomes that in which the torque at a sharing rate of the subsequent gear stage (N+1 gear) has been subjected to hydraulic pressure conversion, from the gear shift start time t1 to the gear shift end time te.

Figure 10:
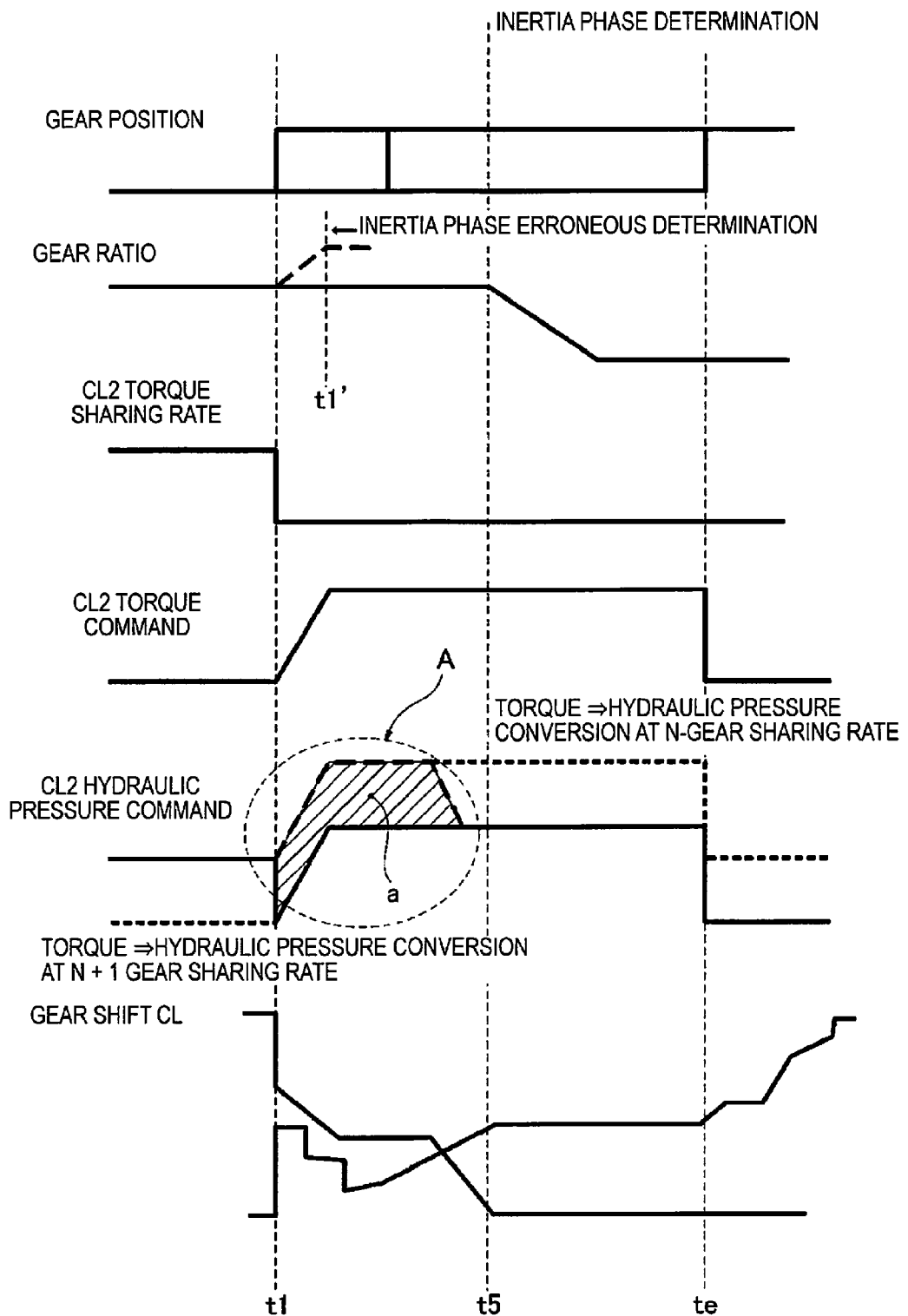
FIG. 10 is a time chart illustrating the respective characteristics of the gear position, gear ratio, CL2 torque sharing rate, CL2 torque command, CL2 hydraulic pressure command, and shifting pressure command (engagement pressure command, release pressure command), when switching the CL2 torque sharing rate from the current gear sharing rate to a subsequent gear sharing rate that is lower than the current gear sharing rate during a shift transition period in a comparative example.

That is, by the CL2 torque sharing rate being lowered to the subsequent gear sharing rate from the gear shift start time t1, the CL2 hydraulic pressure command is lowered by the amount by which the CL2 torque sharing rate has been lowered, as illustrated by the solid line characteristics in the boundary indicated by arrow A in FIG. 10. For example, when the dotted line characteristic indicated by arrow A in FIG. 10 is to be the target CL2 hydraulic pressure command, the portion indicated by the hatching a will be the deficit portion of the CL2 hydraulic pressure command. Then, when the engagement capacity by the CL2 hydraulic pressure command becomes lower than the input torque at that time, there are cases in which the second clutch CL2 will slip unintentionally. Then, when the second clutch CL2 slips and the inertia phase is determined from changes in the gear ratio on the shift control side, it is erroneously determined to be an inertia phase at a time t1' immediately after the gear shift start time t1. In this manner, if it is erroneously determined to be an inertia phase at time t1' when inertia phase determination should be done at time t5, the shifting pressure command on the shift control side becomes a rapid engagement command or a rapid release command, exacerbating shift shock.

Figure 11:
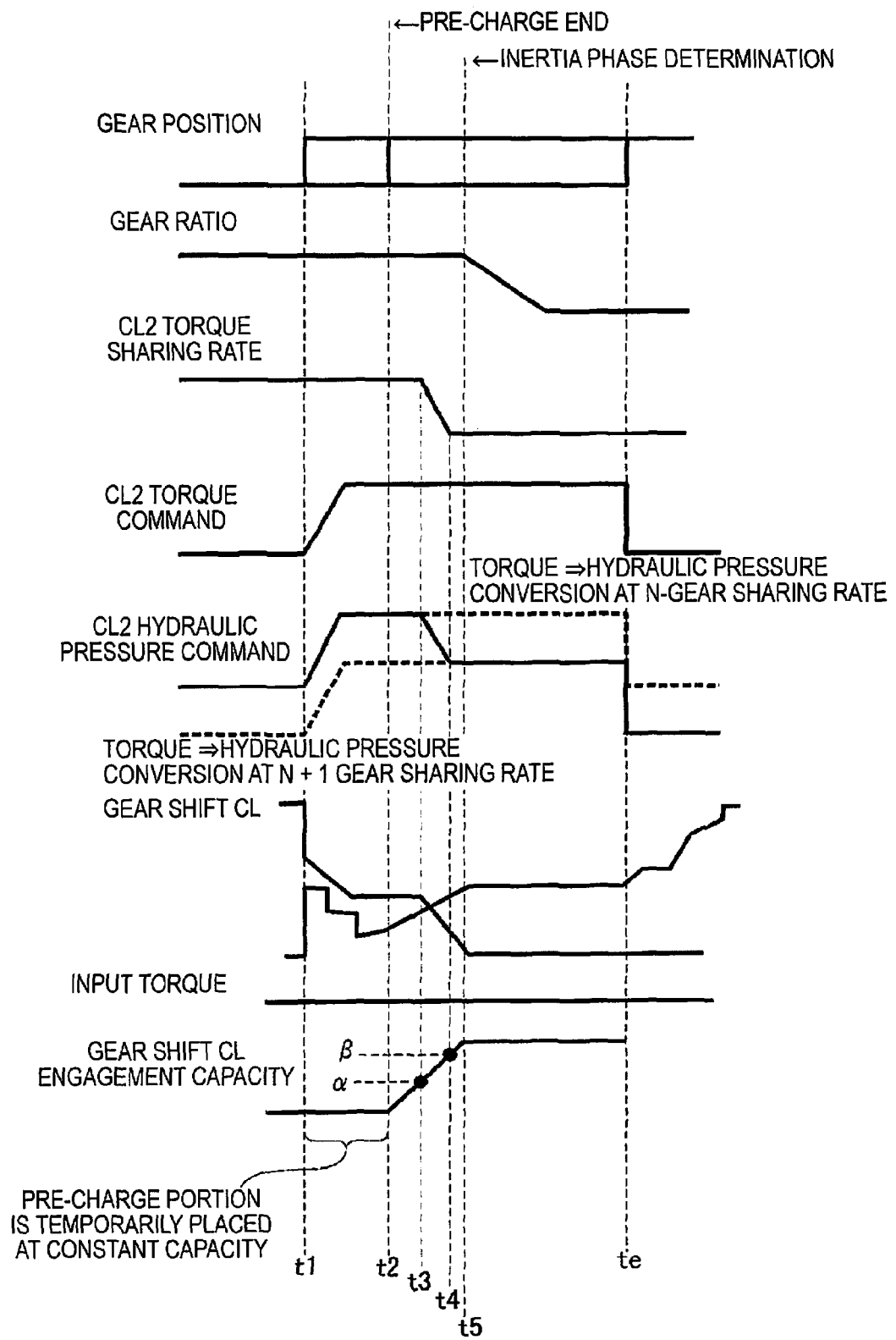
FIG. 11 is a time chart illustrating the respective characteristics of the gear position, gear ratio, CL2 torque sharing rate, CL2 torque command, CL2 hydraulic pressure command, shifting pressure command (engagement pressure command, release pressure command), input torque, and shift clutch engagement capacity when switching the CL2 torque sharing rate from the current gear sharing rate to a subsequent gear sharing rate that is lower than the current gear sharing rate during a shift transition period in the first embodiment.

In contrast, in the case of the first embodiment, as illustrated in the CL2 torque sharing rate characteristics in FIG. 11, the CL2 torque sharing rate is maintained at the current gear sharing rate from the gear shift start time t1 to the pre-charge end time t2. Next, the current gear sharing rate continues to be maintained from the pre-charge end time t2 to the sharing rate switching start time t3 (the time when becoming the sharing rate switching start value α). Then, from the sharing rate switching start time t3 to the sharing rate switching end time t4 (the time when becoming the sharing rate switching end value β), it is switched to a ratio that is continuously decreased, from the current gear sharing rate to a subsequent gear sharing rate. Next, after the sharing rate switching end time t4, the subsequent gear sharing rate is maintained.

Then, the CL2 torque command (the part that increases the engagement capacity during a shift transition period) rises with a steep gradient at the gear shift start time t1 in the same way as the comparative example, and decreases to the CL2 torque command prior to shifting in a stepwise manner at the gear shift end time te. Therefore, the CL2 hydraulic pressure command, which is obtained by substituting the CL2 torque sharing rate and the CL2 torque command into Formula (1) described above, becomes that in which the torque at a sharing rate of the current gear stage (N gear) has been subjected to hydraulic pressure conversion, from the gear shift start time t1 to the gear shift end time te.

That is, the CL2 torque sharing rate will not be lowered to the subsequent gear sharing rate from the gear shift start time t1, as in the comparative example, and will be subjected to hydraulic pressure conversion at the current gear sharing rate, from the gear shift start time t1 to sharing rate switching start time t3, as illustrated in the CL2 hydraulic pressure command characteristic in FIG. 11. Then, from sharing rate switching start time t3 to sharing rate switching end time t4, the CL2 torque sharing rate is lowered so as to connect to the subsequent gear sharing rate, and will be subjected to hydraulic pressure conversion at a sharing rate of the subsequent gear stage (N+1 gear) after sharing rate switching end time t4.

In this way, by subjecting to hydraulic pressure conversion at the current gear sharing rate until the shift CL engagement capacity has a predetermined engagement capacity of sharing rate switching start value α, the generation of unintentional slip of the second clutch CL2 due to a lack of CL2 hydraulic pressure command can be prevented. Then, by being able to prevent the generation of slip of the second clutch CL2, when determining the inertia phase from changes in the gear ratio on the shift control side, the inertia phase can be determined at time t5 without erroneous determination. As a result, the shifting pressure command on the shift control side will be an engagement command and a release command that smoothly connect to the inertia phase; as a result, a good gear shift quality can be obtained.

CL2 Engagement Capacity Control Effect During a Shift Transition Period when the CL2 Torque Sharing Rate Increases The CL2 engagement capacity control effect during a shift transition period when the CL2 torque sharing rate increases will be explained as a specific example of ensuring the required precision, based on FIG. 12 to FIG. 14. An example of a gear shift pattern in which the CL2 torque sharing rate is increased is, for example, a 5→4 downshift pattern in which the third clutch C3 is set as the second clutch CL2 before and after the gear shift, third brake B3 is set as the engagement element of the gear shift, and the first clutch C1 is set as the release element of the gear shift.

First, that which performs switching of the CL2 torque sharing rate as a trigger to start EV shifting shall be the comparative example. In the case of this comparative example, as illustrated in the CL2 torque sharing rate characteristics in FIG. 12, the CL2 torque sharing rate is switched from the current gear sharing rate to a subsequent gear sharing rate (>current gear sharing rate) in a stepwise manner, at a gear shift start time t1. Then, the CL2 torque command (the part that increases the engagement capacity during a shift transition period) rises with a steep gradient at the gear shift start time t1, and decreases to the CL2 torque command prior to shifting in a stepwise manner at a gear shift end time te. Therefore, the CL2 hydraulic pressure command, which is obtained by substituting the CL2 torque sharing rate and the CL2 torque command into Formula (1) described above, becomes that in which the torque at a sharing rate of the subsequent gear stage (N+1 gear) has been subjected to hydraulic pressure conversion, from the gear shift start time t1 to the gear shift end time te.

Figure 12:
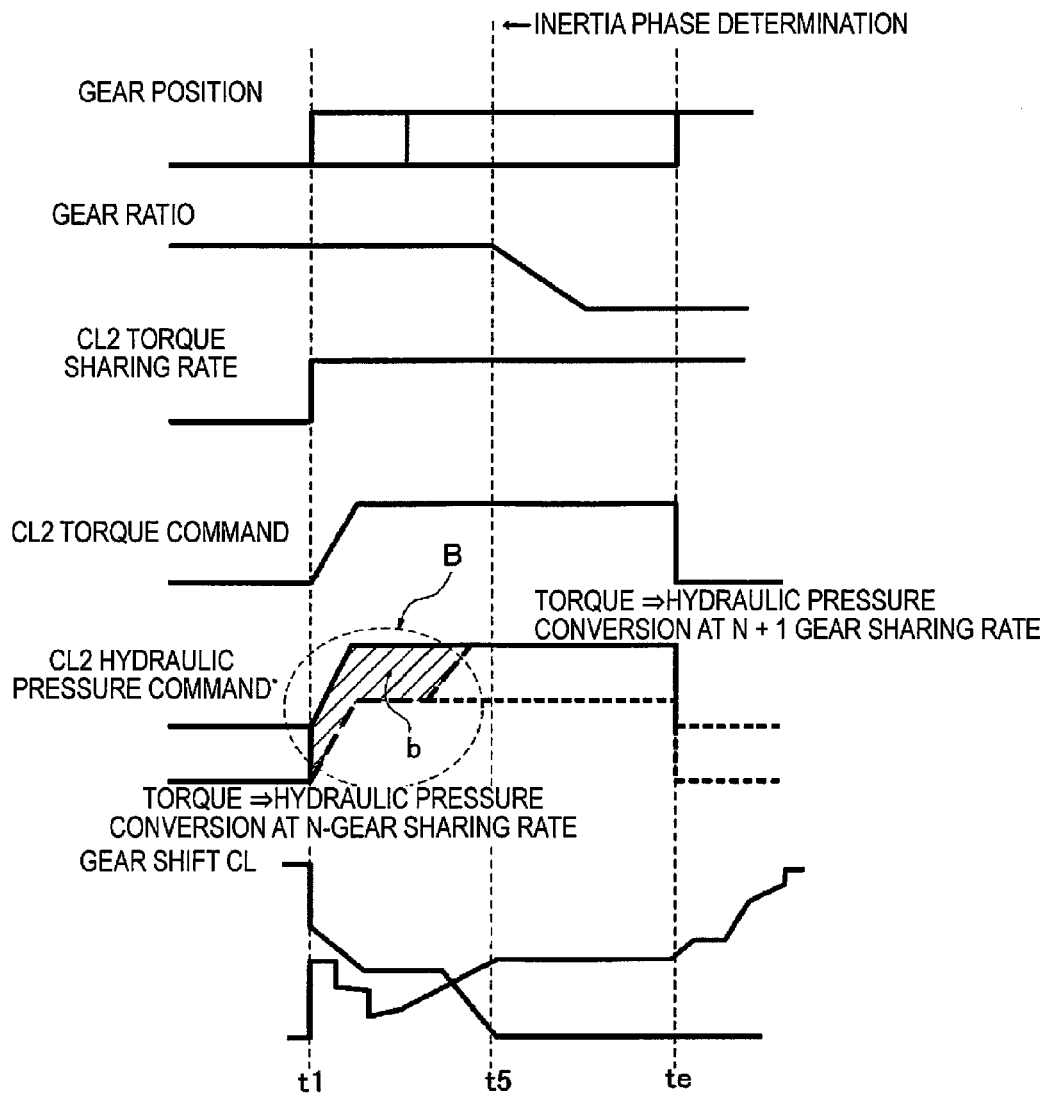
FIG. 12 is a time chart illustrating the respective characteristics of the gear position, gear ratio, CL2 torque sharing rate, CL2 torque command, CL2 hydraulic pressure command, and shifting pressure command (engagement pressure command, release pressure command), when switching the CL2 torque sharing rate from the current gear sharing rate to a subsequent gear sharing rate that is higher than the current gear sharing rate during a shift transition period in a comparative example.
Figure 13:
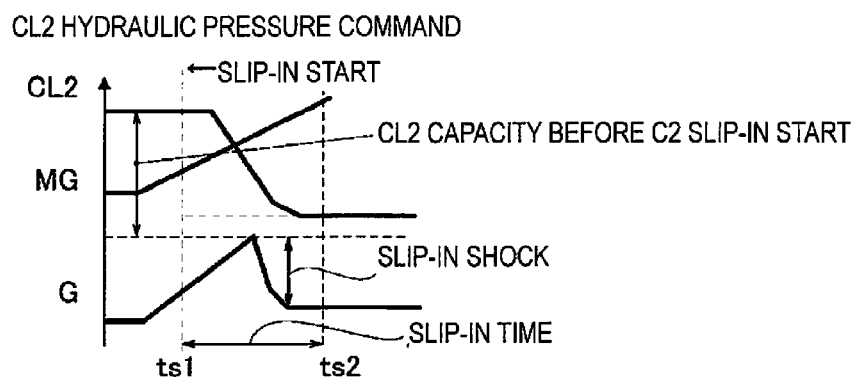
FIG. 13 is a time chart illustrating the respective characteristics of the CL2 hydraulic pressure command, motor torque, and the vehicle longitudinal acceleration, when there is an engine start request during a shift transition period in a comparative example.

That is, by the CL2 torque sharing rate being lowered to the subsequent gear sharing rate from the gear shift start time t1, the CL2 hydraulic pressure command is increased by the amount by which the CL2 torque sharing rate has been increased, as illustrated by the solid line characteristics in the boundary indicated by arrow B in FIG. 12. For example, when the dotted line characteristic indicated by arrow B in FIG. 12 is to be the target CL2 hydraulic pressure command, the portion indicated by the hatching b will be the excess portion of the CL2 hydraulic pressure command. Then, if the engagement capacity by the CL2 hydraulic pressure command is increased by the amount by which the CL2 torque sharing rate has been increased, the CL2 capacity safety factor is increased. If this CL2 capacity safety factor is high, when an engine start request intervenes during EV shifting and the second clutch CL2 is slip-engaged by initiating an engine start, the slip-in time until the second clutch CL2 is in the slip-engaged state and the slip-in shock become large. That is, if the CL2 capacity prior to the CL2 slip-in start is large, time is required for the CL2 capacity to decrease; as a result, even when trying to slip the second clutch CL2 by increasing the torque of the motor/generator MG, the slip-in time becomes long, as illustrated in FIG. 13. This slip-in time is the time from the slip-in start time ts1 to the slip-in determination time ts2. By the increase gradient of the MG torque and the decrease gradient of the CL2 capacity becoming large under slip-in control, changes in the longitudinal G at the slip-in time become large, and the change width in this longitudinal G becomes the slip-in shock, as illustrated by the longitudinal G characteristic in FIG. 13.

Figure 14:
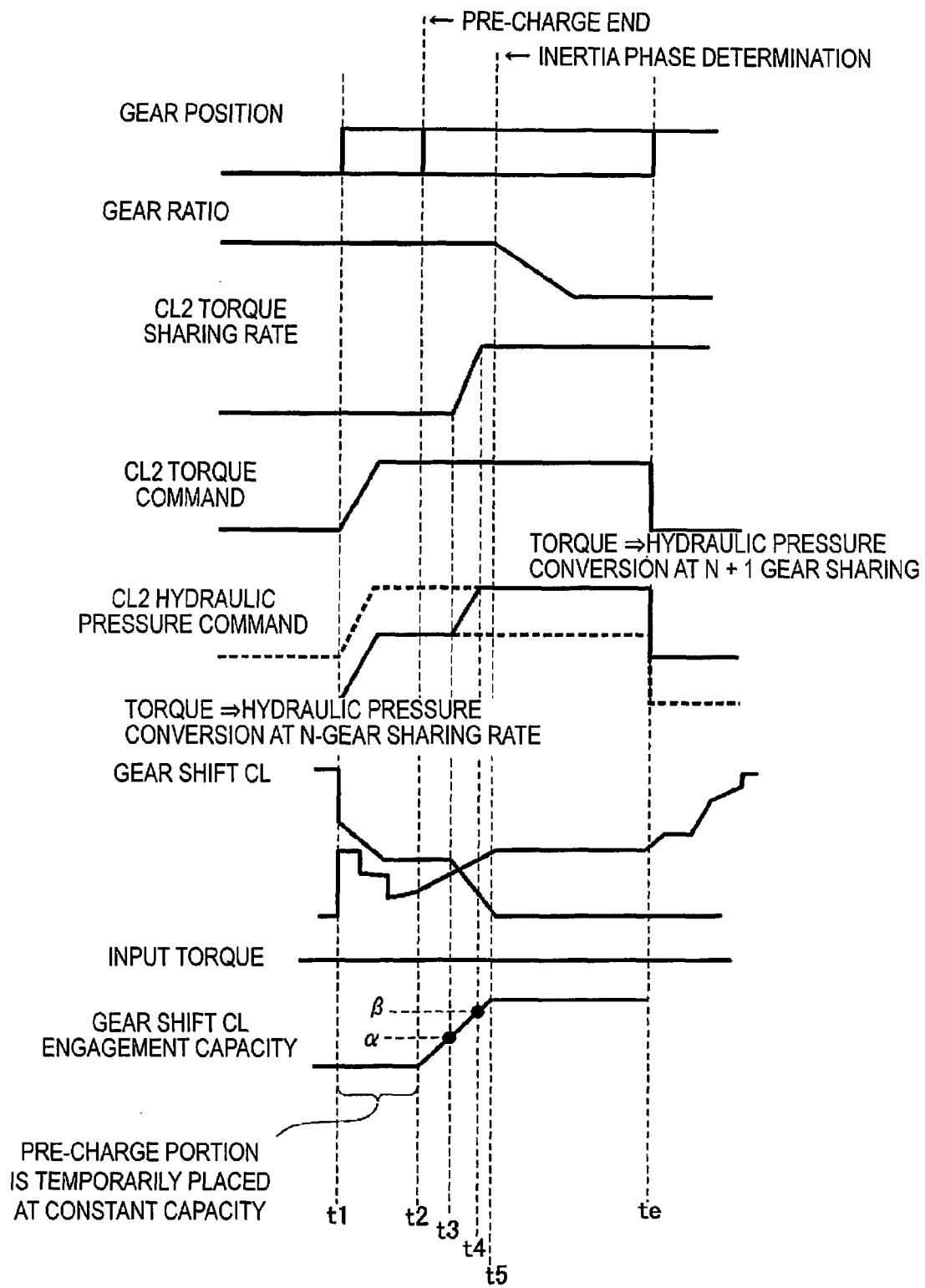
FIG. 14 is a time chart illustrating the respective characteristics of the gear position, gear ratio, CL2 torque sharing rate, CL2 torque command, CL2 hydraulic pressure command, shifting pressure command (engagement pressure command, release pressure command), input torque, and shift clutch engagement capacity when switching the CL2 torque sharing rate from the current gear sharing rate to a subsequent gear sharing rate that is higher than the current gear sharing rate during a shift transition period in the first embodiment.

In contrast, in the case of the first embodiment, as illustrated in the CL2 torque sharing rate characteristics in FIG. 14, the CL2 torque sharing rate is maintained at the current gear sharing rate from the gear shift start time t1 to the pre-charge end time t2. Next, the current gear sharing rate continues to be maintained from the pre-charge end time t2 to the sharing rate switching start time t3 (the time when becoming the sharing rate switching start value α). Then, from the sharing rate switching start time t3 to the sharing rate switching end time t4 (the time when becoming the sharing rate switching end value β), it is switched to a ratio that is continuously increased, from the current gear sharing rate to a subsequent gear sharing rate. Next, after the sharing rate switching end time t4, the subsequent gear sharing rate is maintained.

Then, the CL2 torque command (the part that increases the engagement capacity during a shift transition period) rises with a steep gradient at the gear shift start time t1 in the same way as the comparative example, and decreases to the CL2 torque command prior to shifting in a stepwise manner at the gear shift end time te. Therefore, the CL2 hydraulic pressure command, which is obtained by substituting the CL2 torque sharing rate and the CL2 torque command into Formula (1) described above, becomes that in which the torque at a sharing rate of the current gear stage (N gear) has been subjected to hydraulic pressure conversion, from the gear shift start time t1 to the gear shift end time te.

That is, the CL2 torque sharing rate will not be raised to the subsequent gear sharing rate from the gear shift start time t1, as in the comparative example, and will be subjected to hydraulic pressure conversion at the current gear sharing rate, from the gear shift start time t1 to sharing rate switching start time t3, as illustrated in the CL2 hydraulic pressure command characteristic in FIG. 14. Then, from sharing rate switching start time t3 to sharing rate switching end time t4, the CL2 torque sharing rate is raised so as to connect to the subsequent gear sharing rate, and will be subjected to hydraulic pressure conversion at a sharing rate of the subsequent gear stage (N+1 gear) after sharing rate switching end time t4.

In this way, by subjecting to hydraulic pressure conversion at the current gear sharing rate until the shift CL engagement capacity has a predetermined engagement capacity of sharing rate switching start value α, the CL2 hydraulic pressure command becoming excessive can be prevented. Then, when an engine start request intervenes during EV shifting and the second clutch CL2 is slip-engaged by initiating an engine start, the slip-in time until the second clutch CL2 is in a slip-engaged state and the slip-in shock become small. As a result, when an engine start request intervenes during EV shifting, ensuring a response and preventing shock at engine start can be achieved.

Next, the effects are described. The effects listed below can be obtained with the FR hybrid vehicle control device according to the first embodiment.

(1) Comprises a motor (motor/generator MG) provided as a drive source; an automatic transmission that is disposed between the motor and a driving wheel (left and right rear wheels RL, RR) and comprises a plurality of shifting elements for switching a plurality of gear stages; a shift control means (AT controller 7) configured to set the shifting element that is engaged during a gear shift by the automatic transmission as an engagement element, and sets the shifting element that is released as a release element, to execute a gear shift; a frictional engagement element (second clutch CL2) that disposed in a power transmission path between the motor (motor/generator MG) and the driving wheels (left and right rear wheels RL, RR), and that is fully engaged or slip-engaged as an element other than a shifting element that is involved in the gear shift of the automatic transmission; a control means for switching the torque sharing rate (control unit 71 for switching the CL2 torque sharing rate, FIG. 7) that delays switching the torque sharing rate, which is a sharing rate of transmission torque allocated to the frictional engagement element (second clutch CL2) according to the engagement capacity, during a shift transition period from the start of the gear shift to the end of the gear shift, until the start of the shifting procedure, and continuously switches a current gear sharing rate to a subsequent gear sharing rate in accordance with the degree of the shifting procedure when the shifting procedure starts; and an engagement capacity control means (torque/oil pressure command converter 72, oil pressure/electric current command converter 73) for controlling the engagement capacity of the frictional engagement element (second clutch CL2) during the shift transition period, in accordance with the switched torque sharing rate (FIG. 7). Accordingly, the required engagement capacity precision of a frictional engagement element (second clutch CL2) can be ensured by appropriately switching a torque sharing rate during a shift transition period.

(2) The control means for switching the torque sharing rate (control unit 71 for switching the CL2 torque sharing rate, FIG. 7) uses a value obtained by dividing the engagement capacity of the engagement element, which is engaged during a gear shift, by the input torque to the engagement element (engagement CL engagement capacity @ input end/input torque) as the index representing the degree of the shifting procedure, to calculate a torque sharing rate for continuously switching from the current gear sharing rate to a subsequent gear sharing rate (FIG. 7). Accordingly, in addition to the effect of (1), the shifting procedure can be correctly read even if the gear ratio is matched by controlling the motor rotational speed during a gear shift.

(3) When in a gear shift pattern in which there are several engagements CL, which are engaged during EV shifting, the control means for switching the torque sharing rate (control unit 71 for switching the CL2 torque sharing rate, FIG. 7), sets the engagement element with the lowest engagement capacity of the plurality of engagement elements to be the target for calculating the torque sharing rate (FIG. 7). Accordingly, in addition to the effect of (2), the torque sharing rate can be appropriately switched without raising the CL2 capacity safety factor.

(4) The control means for switching the torque sharing rate (control unit 71 for switching the CL2 torque sharing rate, FIG. 7) uses a gear ratio value, which is the ratio of the input/output rotational speed of the automatic transmission AT, as an index representing the degree of the shifting procedure, when in a gear shift pattern in which the engagement element, which is engaged during a gear shift, is a one-way clutch, to calculate a torque sharing rate for continuously switching from the current gear sharing rate to a subsequent gear sharing rate (FIG. 7). Accordingly, in addition to the effects of (1)-(3), when in a gear shift pattern in which the engagement element is a one-way clutch, the CL2 torque sharing rate can be continuously switched in accordance with the degree of the shifting procedure.

(5) The control means for switching the torque sharing rate (control unit 71 for switching the CL2 torque sharing rate, FIG. 7) sets the sharing rate switching start value α and the sharing rate switching end value β from the current gear sharing rate to a subsequent gear sharing rate for each gear shift type. Accordingly, in addition to the effects of (1)-(4), the CL2 torque sharing rate can be appropriately switched regardless of the gear shift type of the automatic transmission AT.

(6) The electric vehicle is a hybrid vehicle comprising an engine Eng and a motor (motor/generator MG) as a drive source, wherein the frictional engagement element (second clutch CL2) transitions to a slip-engagement control when an engine start request intervenes during EV shifting (FIG. 14). Accordingly, in addition to the effects of (1)-(5), when an engine start request intervenes during EV shifting, ensuring response and preventing shock at engine start can be achieved.

The electric vehicle control device of the present invention was described above based on the first embodiment, but specific configurations thereof are not limited to the first embodiment, and various modifications and additions to the design can be made without departing from the scope of the invention according to each claim in the Claims.

In the first embodiment, an example was shown in which the shifting element in the automatic transmission AT was diverted as the frictional engagement element, and the element selected from three engagement elements that are engaged at each gear stage is set as the second clutch CL2. However, the frictional engagement element may be a second clutch that is provided independently of the automatic transmission, such as a second clutch that is disposed between the motor and the input shaft of the automatic transmission, or a second clutch that is disposed between the output shaft of the automatic transmission and the driving wheels. In this case, all gear shift patterns will have an engagement element for a gear shift, a release element for a gear shift, and a frictional engagement element (second clutch).

In claim 1, an example was shown in which, when in a gear shift pattern in which there are several engagement elements, which are engaged during a gear shift, the engagement element with the lowest engagement capacity of the several engagement elements is set as the target for calculating the torque sharing rate, as the control means for switching the torque sharing rate. However, the control means for switching the torque sharing rate may be an example in which, when in a gear shift pattern in which there are several engagement elements which are engaged during a gear shift, calculation is executed with all of the several engagement elements set as targets for calculating the torque sharing rate, then using the torque sharing rate when all of the engagement elements satisfy the conditions.

In the first embodiment, an example was shown in which the electric vehicle control device of the present invention is applied to a one-motor two-clutch FR hybrid vehicle. However, the control device of the present invention may be applied, needless to say to one-motor two-clutch FF hybrid vehicles, but also to other than one-motor two-clutch, for example, to parallel type hybrid vehicles comprising a power split mechanism. Also, the control device may be applied to an electric vehicle, etc., comprising a stepped automatic transmission in the drive system.

The invention claimed is:

1. An electric vehicle control device comprising:
a motor provided as a drive source;
an automatic transmission disposed between the motor and a driving wheel, and the automatic transmission comprising a plurality of shifting elements for switching a plurality of gear stages;
a shift controller programmed to set each of the shifting elements that is engaged during a gear shift by the automatic transmission as an engagement element, and set each of the shifting elements that is released as a release element, to execute the gear shift;
a frictional engagement element disposed in a power transmission path between the motor and the driving wheel, and fully engaged or slip-engaged as an element other than one of the shifting elements that is involved in the gear shift of the automatic transmission;
a control unit programmed to switch a torque sharing rate, which is a sharing rate of transmission torque allocated to the frictional engagement element according to an engagement capacity, such that during a shift transition period a switched torque sharing rate is delayed from a start of the gear shift to an end of the gear shift until a start of a shifting procedure, and continuously switch from a current gear sharing rate to a subsequent gear sharing rate in accordance with a degree of the shifting procedure when the shifting procedure starts; and
an engagement capacity control section programmed to control the engagement capacity of the frictional engagement element during the shift transition period, in accordance with the switched torque sharing rate,
the control unit being programmed to calculate the torque sharing rate used for continuously switching from the current gear sharing rate to the subsequent gear sharing rate by using a value obtained by dividing the engagement capacity of the engagement element, which is engaged during the gear shift by an input torque to the engagement element, as an index representing the degree of the shifting procedure.

2. The electric vehicle control device according to claim 1, wherein the control unit is further programmed to set the engagement element with a lowest engagement capacity of the engagement elements as a target for calculating the torque sharing rate when several of the engagement elements are engaged during the gear shift.

3. The electric vehicle control device according to claim 2, wherein the control unit is further programmed to calculate the torque sharing rate for continuously switching from the current gear sharing rate to the subsequent gear sharing rate by using a gear ratio value, which is a ratio of the input/output rotational speed of the automatic transmission AT, as the index representing the degree of the shifting procedure, when a one-way clutch is engaged as the engagement element during the gear shift.

4. The electric vehicle control device according to claim 2, wherein the control unit is further programmed to set a sharing rate switching start value and a sharing rate switching end value from the current gear sharing rate to the subsequent gear sharing rate for each gear shift type.

5. The electric vehicle control device according to claim 2, wherein the electric vehicle is a hybrid vehicle comprising an engine and the motor as a drive source, and the frictional engagement element transitions to a slip-engagement control when an engine start request intervenes during EV shifting.

6. The electric vehicle control device according to claim 1, wherein the control unit is further programmed to calculate the torque sharing rate for continuously switching from the current gear sharing rate to the subsequent gear sharing rate by using a gear ratio value, which is a ratio of the input/output rotational speed of the automatic transmission AT, as the index representing the degree of the shifting procedure, when a one-way clutch is engaged as the engagement element during the gear shift.

7. The electric vehicle control device according to claim 6, wherein the control unit is further programmed to set a sharing rate switching start value and a sharing rate switching end value from the current gear sharing rate to the subsequent gear sharing rate for each gear shift type.

8. The electric vehicle control device according to claim 6, wherein the electric vehicle is a hybrid vehicle comprising an engine and the motor as a drive source, and the frictional engagement element transitions to a slip-engagement control when an engine start request intervenes during EV shifting.

9. The electric vehicle control device according to claim 1, wherein the control unit is further programmed to set a sharing rate switching start value and a sharing rate switching end value from the current gear sharing rate to the subsequent gear sharing rate for each gear shift type.

10. The electric vehicle control device according to claim 9, wherein the electric vehicle is a hybrid vehicle comprising an engine and the motor as a drive source, and the frictional engagement element transitions to a slip-engagement control when an engine start request intervenes during EV shifting.

11. The electric vehicle control device according to claim 1, wherein the electric vehicle is a hybrid vehicle comprising an engine and the motor as a drive source, and the frictional engagement element transitions to a slip-engagement control when an engine start request intervenes during EV shifting.

* * * * *